United States Patent [19]

Mitani et al.

[11] Patent Number: 5,308,905
[45] Date of Patent: May 3, 1994

[54] POLYVINYL CHLORIDE RESIN COMPOSITION AND SURFACE DELUSTERED ARTICLE

[75] Inventors: Tugio Mitani, Takatsuki; Masayuki Yoshihara, Toyonaka; Hiroaki Maruyama, Nagoya, all of Japan

[73] Assignee: Sumitomo Chemical Company, Limited, Osaka, Japan

[21] Appl. No.: 5,173

[22] Filed: Jan. 15, 1993

Related U.S. Application Data

[63] Continuation of Ser. No. 810,884, Dec. 20, 1991, abandoned.

[51] Int. Cl.$^5$ ............................................. C08K 5/09
[52] U.S. Cl. .................................. 524/310; 264/134; 264/328.17; 428/409; 524/317; 524/399; 524/400; 524/567
[58] Field of Search .................. 264/328.17, 134; 524/567, 399, 400, 180, 310, 317; 428/409

[56] References Cited

U.S. PATENT DOCUMENTS

| | | | |
|---|---|---|---|
| 2,711,401 | 6/1955 | Lally | 524/310 |
| 3,453,225 | 7/1969 | Pollock | 260/23 |
| 4,134,868 | 1/1979 | Minagawa et al. | 260/23 |
| 4,218,352 | 8/1980 | Takeuchi et al. | 260/23 |
| 4,269,742 | 5/1981 | Hulyalkar et al. | 260/23 |
| 4,751,118 | 6/1988 | Wypart et al. | 524/310 |
| 4,814,369 | 3/1989 | Baker | 524/287 |

FOREIGN PATENT DOCUMENTS

| | | |
|---|---|---|
| 0073046 | 3/1983 | European Pat. Off. |
| 0172479 | 2/1986 | European Pat. Off. |
| 1241106 | 5/1967 | Fed. Rep. of Germany |
| 1569372 | 4/1971 | Fed. Rep. of Germany |
| 2009772 | 6/1979 | United Kingdom |

*Primary Examiner*—Veronica P. Hoke
*Attorney, Agent, or Firm*—Wenderoth, Lind & Ponack

[57] ABSTRACT

A method of making a matted article, as well as the article per se wherein it is derived from molding and heat treating a vinyl chloride resin composition incorporated with 0.002–0.02 mol of zinc carboxylate for 100 g of vinyl chloride resin and 0.3–5 mol of a compound having two or more alcoholic hydroxyl groups in one molecule per mol of the zinc carboxylate. This composition yields an article having a good matte-finished surface owing to minute corrugated irregularities formed on the surface.

11 Claims, No Drawings

POLYVINYL CHLORIDE RESIN COMPOSITION AND SURFACE DELUSTERED ARTICLE

This application is a continuation of now abandoned application Ser. No. 07/810,884, filed Dec. 20, 1991.

BACKGROUND OF THE INVENTION

1. Field of the Invention

The present invention relates to a vinyl chloride resin composition for vinyl chloride resin products and also to a matte-finished or surface delustered article produced therefrom.

2. Description of the Prior Art

There is an increasing demand for matte-finished vinyl chloride resin products in such application areas as wall covering, flooring, vehicle interior, electric wires, and daily necessities, where reduced surface gloss, non-glare reflection, dry feeling, and quiet appearance are desirable. There are several methods for their matte finishing by (1) physically forming a rough surface, (2) compounding with a special component which gives rise to a rough surface, or (3) coating the surface with dull lacquer.

Method (1) involves embossing with finely textured dies, sand blasting, and dusting with fine particles in the course of molding. A disadvantage of mechanical embossing is unsatisfactory matte-finishing which results from the fading out of embossed patterns that takes place after the embossing operation owing to the viscoelastic properties of the material. Another disadvantage of mechanical embossing is that the embossing die becomes contaminated during the embossing operation. Sand blasting is applicable only to articles having a hard surface and needs a complex apparatus to confine and recover fine particles. Dusting with fine particles also needs a special apparatus for uniform dusting and recovery of fine particles.

Method (2) involves blending with a vinyl chloride resin having a different particle diameter, blending with a vinyl chloride resin having a different degree of polymerization, incorporation with a specific polymer other than vinyl chloride resin, partial crosslinking, and incorporation of a large amount of inorganic filler such as calcium carbonate. The first three methods have a disadvantage that the molding process depends largely on the molding condition, that is, no satisfactory matting effect is obtained with a high molding temperature. Incorporation with a large amount of filler has an adverse effect on the physical properties of articles, e.g., decrease in tensile strength.

Method (3) is effective in matte finishing but is economically poor in that it needs a special coating material and additional steps for coating and drying.

The present invention was completed to address the above-mentioned problems associated with the conventional matte-finishing method for vinyl chloride resin products.

SUMMARY OF THE INVENTION

It is an object of the present invention to provide a vinyl chloride resin composition which yields molded articles having a good matte-finish surface because of its ability to form minute irregularities uniformly when it is molded by means of the existing apparatus for the casting, dipping, or coating of plastisol or organosol.

The present invention is embodied in a vinyl chloride resin composition incorporated with 0.002–0.02 mol of zinc carboxylate for 100 g of vinyl chloride resin and 0.3–5 mol of a compound having two or more alcoholic hydroxyl groups in one molecule per mol of said zinc carboxylate.

The vinyl chloride resin composition of the above-mentioned special composition yields molded articles having a good matte-finishing surface with minute corrugations.

DETAILED DESCRIPTION OF THE INVENTION

The vinyl chloride resin composition of the present invention is based on a vinyl chloride resin which is a homopolymer of vinyl chloride, or a copolymer of vinyl chloride with a comonomer copolymerizable with vinyl chloride, or a mixture thereof. Exemplary comonomers include vinyl acetate, acrylate esters, and methacrylate esters.

The vinyl chloride resin used in the present invention is usually produced by emulsion polymerization, microsuspension polymerization, suspension polymerization, or bulk polymerization. It is not specifically limited in particle diameter. Its average diameter usually ranges from 0.1 to 200 μm. One having an average diameter of 0.1–80 μm is preferable, which is used in the form of plastisol or organosol.

The zinc carboxylate used in the present invention should preferably be a zinc salt of a monocarboxylic acid having 3–18 carbon atoms. One or more zinc carboxylates may be used. Examples include zinc octanoate, zinc hexanoate, zinc butanoate, zinc propionate, zinc heptanoate, zinc pentanoate, zinc nonanoate, zinc decanoate, zinc 2-ethylhexanoate, zinc laurate, zinc palmitate, and zinc stearate. A zinc salt of a monocarboxylic acid having 6–10 carbon atoms is preferable because it is liquid at normal temperature or readily soluble in common hydrocarbon or carbitol solvents, which facilitates uniform dispersion into the vinyl chloride resin, reducing the amount required for the desired effect.

According to the present invention, the zinc carboxylate should be incorporated in an amount of 0.002–0.02 mol, preferably 0.0025–0.02 mol, for 100 g of the vinyl chloride resin. With an amount less than 0.002 mol, the zinc carboxylate does not produce a satisfactory matte-finishing effect. The zinc carboxylate in excess of 0.02 mol does not add to the matte-finishing effect but is wasted.

Zinc carboxylate is often used, as a heat stabilizer for vinyl chloride resin, in combination with an alkaline earth metal salt of a carboxylic acid, such as calcium carboxylate and barium carboxylate. The latter, however, is detrimental to the matte-finishing effect which is intended in the present invention. Therefore, it should be used in an amount less than 0.7 mol, preferably less than 0.5 mol, per mol of zinc carboxylate.

Other compounds which are detrimental to the matte-finishing effect, like an alkaline earth metal salt of a carboxylic acid, include tin compounds (such as dibutyltin dilaurate and dibutyltin maleate) and lead compounds (such as lead sulfate, lead phosphite, and lead stearate), which are common heat stabilizers for vinyl chloride resin. These tin compounds or lead compounds should be used in an amount less than 0.3 mol per mol of zinc carboxylate, if they are to be used in combination with a zinc carboxylate. Additional compounds detrimental to the matte-finishing effect include alkali metal carboxylates, which should be used in an amount less than 0.3 mol per mol of zinc carboxylate.

The vinyl chloride resin composition of the present invention is incorporated with a compound having two or more alcoholic hydroxyl groups in one molecule (referred to as polyhydric alcohol). Examples of the polyhydric alcohol include glycerin, pentaerythritol, dipentaerythritol, sorbitol, 1,4-sorbitan, 1,5-sorbitan, and mannitol. They also include partial esters formed from the polyhydric alcohol and a fatty acid having 12-18 carbon atoms, which are exemplified by sorbitan partial esters (such as sorbitan monolaurate, sorbitan monopalmitate, sorbitan monooleate, sorbitan monostearate sorbitan and distearate), glycerin partial esters (such as glycerin monolaurate and glycerin monooleate), condensed glycerin partial esters (such as diglycerin monolaurate, tetraglycerin oleate, hexaglycerin laurate, and decaglycerin laurate), partial esters of a fatty acid with pentaerythritol monostearate), trimethylolpropane monoesters (such as trimethylolpropane monostearate), and partial esters of glycerin with a hydroxycarboxylic acid (such as glycerin monohydroxystearate).

According to the present invention, the polyhydric alcohol should be used in an amount of 0.3-5 mol, preferably 0.5-4.5 mol, per mol of the above-mentioned zinc carboxylate. (The molar amount is based on a polyhydric alcohol having three hydroxyl groups in one molecule.) With an amount less than 0.3 mol, the polyhydric alcohol does not produce the desired matte-finishing effect. With an amount in excess of 5 mol, the polyhydric alcohol bleeds out of the molded article, resulting in coarse surface irregularities which are detrimental to the uniform matte-finishing effect. Moreover, an excess amount of polyhydric alcohol leads to a higher production cost. In the case of a polyhydric alcohol having any number of hydroxyl groups except three, the amount should be corrected by multiplying the above-mentioned standard amount (0.3-5 mol) by a factor which is calculated by dividing 3 by the number of hydroxyl groups in one molecule. In the case of a partial ester of a fatty acid with a polyhydric alcohol or a mixture of partial esters, where the number of hydroxyl groups in one molecule is not definite, an adequate amount should be established by trial and error on the basis of the above-mentioned amount.

The vinyl chloride resin composition of the present invention may be incorporated with a variety of additives, such as plasticizer, filler, pigment, stabilizer, and blending resin, which are commonly used for vinyl chloride resins. However, some stabilizers could be detrimental to the matte-finishing effect, as mentioned above.

For example the vinyl chloride resin composition of the present invention is in the form of plastisol or organosol which is composed of a vinyl chloride resin and a variety of components. It is processed into film, sheet, leather, and other molded articles by casting, dipping, or coating. The molded articles are finished by heat treatment for gelation. The heat treatment may be accomplished by means of an oven or drying tunnel. This step is important for the matte-finishing effect to fully develop.

The matte-finishing effect depends on the heating temperature and heating time. In the case of a small oven, heating should be carried out at 200° C. for more than about 40 seconds, at 180° C. for more than about 80 seconds, at 160° C. for more than about 120 seconds, or at 140° C. for more than 160 seconds. An adequate heating condition should be selected according to the particular composition.

The vinyl chloride resin composition of the present invention is not specifically limited in its form and molding method. It may take a powder form and pellet form, in addition to plastisol and organosol. The powder or pellet form may be prepared from an extrusion-grade vinyl chloride resin having an average particle diameter of 100-150 μm. Such a composition may undergo calendaring, extrusion molding, or injection molding. The resulting molded article will have the matte-finishing surface upon post-heating. For example, a rolled sheet may be heated, with its surface kept at about 200° C. for more than 40 seconds, to produce the matte-finishing effect. A composition incorporated with a blowing agent is also capable of matte finishing in a similar manner. Moreover, a powder composition for fluidized bed coating, electrostatic coating, or cast-sintering is capable of matte finishing.

There are no specific restrictions on the method for preparing the vinyl chloride resin composition of the present invention, so long as the resulting composition achieves the desired object of the present invention. For example, it is possible to previously add either a polyhydric alcohol or a zinc carboxylate during the production of vinyl chloride resin.

The vinyl chloride resin composition of the present invention yields molded articles which exhibit a good matte finish effect upon heat treatment after the molding operation. The thus obtained molded articles have a matte-finished surface with reduced gloss, good feel, and non-glaring quiet appearance. The vinyl chloride resin compound of the present invention may be applied to wall covering, flooring, leather, sailcloth, vehicle interior, coated steel sheet, coated cotton cloth, coated yarn, tool gripping coat, protective gloves, toys, and daily necessities.

The invention will be described in more detail with reference to the following examples.

EXAMPLES 1 TO 9 AND COMPARATIVE EXAMPLES 1 TO 3

A plastisol was prepared from the following components by compounding for 15 minutes using a twin-screw stirring mixer.

| | |
|---|---|
| Vinyl chloride resin* | 100 g |
| *Sumilit ® PXNHA (a product of Sumitomo Chemical Co., Ltd.) having an average particle diameter of 1.1 μm. | |
| Di-2-ethylhexyl phthalate | 65 g |
| Calcium carbonate* | 40 g |
| *Whiton ® SB red (a product of Shiraishi Kogyo Co., Ltd.) | |
| Titanium white* | 5 g |
| *R-820 (a product of Titan Kogyo Co., Ltd.) | |
| Zinc octoate* | as per Table 1 |
| *KV-75A-1, 59% solution (a product of Kyodo Yakuhin Co., Ltd.) | |
| Sorbitan monolaurate | as per Table 1 |

The resulting plastisol was cast onto flame-retardant paper to form a 200-μm thick coating using a laboratory knife coater. The coated paper was passed through a tunnel dryer for slight heat treatment so that the coating film was semi-geled. After cooling, rectangular test pieces were cut out of the coated paper. The test pieces were geled completely by heating in an oven at 210° C. for different periods of time as indicated in Table 1. Finally, the test pieces were evaluated by testing for 60° reflectance (%). The smaller the value of 60° reflectance, the better the matte-finishing effect. The 60° reflectance for practical use should be lower than 30%, preferably lower than 10%.

EXAMPLES 10 TO 16 AND COMPARATIVE EXAMPLES 4 AND 5

The same procedure as in Example 7 was repeated except that the sorbitan monolaurate was replaced by the polyhydric alcohol shown in Table 2. The results are also shown in Table 2.

EXAMPLES 17 TO 20 AND COMPARATIVE EXAMPLES 6 TO 8

The same procedure as in Example 6 was repeated except that the zinc octoate was replaced by the zinc carboxylate shown in Table 3. The results are also shown in Table 3.

Incidentally, the specimen in Comparative Example 6 gives low reflectance values, but it is not of practical use because of its coarse surface irregularities.

EXAMPLES 21 TO 26 AND COMPARATIVE EXAMPLES 9 TO 12

The same procedure as in Example 5 was repeated except that the composition was incorporated with any of tin stabilizer ("KS-22" made by Kyodo Yakuhin Co., Ltd.), calcium octoate, and potassium octoate as shown in Table 4. The results are also shown in Table 4.

TABLE 1

| | (Examples 1 to 9 and Comparative Examples 1 to 3) | | | | | | | | | | | |
|---|---|---|---|---|---|---|---|---|---|---|---|---|
| Example (Comparative Example) | 1 | 2 | 3 | 4 | 5 | 6 | 7 | 8 | 9 | (1) | (2) | (3) |
| Zinc octoate added | | | | | | | | | | | | |
| Grams | 1.5 | 2 | 2 | 3 | 3 | 3 | 5 | 8 | 11 | 1.5 | 1.5 | 1.0 |
| Mol ($\times 10^{-3}$) | 2.5 | 3.4 | 3.4 | 5.0 | 5.0 | 5.0 | 8.4 | 13.5 | 18.5 | 2.5 | 2.5 | 1.7 |
| Sorbitan monolaurate added | | | | | | | | | | | | |
| Grams | 1 | 1 | 3 | 1 | 3 | 5 | 5 | 11 | 8 | 0.2 | 5 | 2 |
| Mol ($\times 10^{-3}$) | 2.9 | 2.9 | 8.7 | 2.9 | 8.7 | 14.5 | 14.5 | 31.8 | 23.1 | 0.6 | 14.5 | 5.8 |
| 60° reflectance (%) | | | | | | | | | | | | |
| Geled by heating for 40 s. | 70 | 67 | 34 | 57 | 11 | 8 | 2 | 4 | 48 | 65 | 56 | 63 |
| Geled by heating for 80 s. | 8 | 6 | 6 | 3 | 3 | 4 | 2 | 2 | 3 | 61 | 58 | 57 |
| Geled by heating for 120 s. | 4 | 3 | 4 | 2 | 3 | 4 | 2 | 2 | 2 | 58 | 52 | 55 |

TABLE 2

| | | | (Examples 10 to 16 and Comparative Examples 4 and 5) | | | | | | | | |
|---|---|---|---|---|---|---|---|---|---|---|---|
| Example (Comparative Example) | grams | $\times 10^{-3}$ mol | 10 | 11 | 12 | 13 | 14 | 15 | 16 | (4) | (5) |
| Additives | | | | | | | | | | | |
| Zinc octoate | 5 | 8.4 | * | * | * | * | * | * | * | * | * |
| Sorbitan monopalmitate | 5 | 12.4 | * | | | | | | | | |
| Sorbitan monostearate | 5 | 11.6 | | * | | | | | | | |
| Sorbitan distearate | 5 | 11.3 | | | * | | | | | | |
| Sorbitan monooleate | 8 | 18.6 | | | | * | | | | | |
| Glycerin monolaurate | 5 | 18.2 | | | | | * | | | | |
| Diglycerin monolaurate | 5 | 14.3 | | | | | | * | | | |
| Pentaerythritol | 2 | 14.7 | | | | | | | * | | |
| Sorbitan trioleate | 10 | 10.5 | | | | | | | | * | |
| Glycerin ditrioleate** | 8 | 9.8 | | | | | | | | | * |
| 60° reflectance (%) | | | | | | | | | | | |
| Geled by heating for 40 s. | | | 4 | 8 | 8 | 77 | 17 | 17 | 14 | 63 | 61 |
| Geled by heating for 80 s. | | | 2 | 3 | 4 | 17 | 13 | 16 | 10 | 61 | 58 |
| Geled by heating for 120 s. | | | 2 | 2 | 3 | 3 | 21 | 17 | 13 | 62 | 62 |

*Refer to the left columns for the kind and amount of the additive added.
**Rikemal OL-95" made by Riken Vitamin Co., Ltd.

TABLE 3

| | | | (Examples 17 to 20 and Comparative Examples 6 to 8) | | | | | | |
|---|---|---|---|---|---|---|---|---|---|
| Example (Comparative Example) | grams | $\times 10^{-3}$ mol | 17 | 18 | 19 | 20 | (6) | (7) | (8) |
| Additives | | | | | | | | | |
| Zinc hexanoate | 4 | 7.6 | * | | | | | | |
| Zinc nanoate | 4 | 7.6 | | * | | | | | |
| Zinc laurate | 5 | 10.8 | | | * | | | | |
| Zinc stearate | 5 | 7.9 | | | | * | | | |
| Zinc acetate | 4 | 21.9 | | | | | * | | |
| Zinc oxide | 0.5 | 6.2 | | | | | | * | |
| Zinc maleate | 1 | 5.6 | | | | | | | * |
| Sorbitan monolaurate | 5 | 14.5 | * | * | * | * | * | * | * |
| 60° reflectance (%) | | | | | | | | | |
| Geled by heating for 40 s. | | | 14 | 18 | 28 | 20 | 33 | 64 | 69 |
| Geled by heating for 80 s. | | | 12 | 8 | 24 | 26 | 15 | 61 | 65 |
| Geled by heating for 120 s. | | | 9 | 6 | 22 | 23 | 6 | 38 | 64 |

*Refer to the left columns for the kind and amount of the additive added.

TABLE 4

| | (Examples 21 to 26 and Comparative Examples 9 to 12) | | | | | | | | | |
|---|---|---|---|---|---|---|---|---|---|---|
| Example (Comparative Example) | 21 | 22 | 23 | 24 | 25 | 26 | (9) | (10) | (11) | (12) |
| Additives | | | | | | | | | | |
| Zinc octoate | 3 (5) | 3 (5) | 3 (5) | 3 (5) | 3 (5) | 3 (5) | 3 (5) | 3 (5) | 3 (5) | 3 (5) |
| Sorbitan monolaurate | 3 (8.7) | 3 (8.7) | 3 (8.7) | 3 (8.7) | 3 (8.7) | 3 (8.7) | 3 (8.7) | 3 (8.7) | 3 (8.7) | 3 (8.7) |
| Tin stabilizer (KS-22) | 0.5 (0.6) | 1.0 (1.1) | | | | | 2 (2.2) | 3 (3.3) | | |
| Calcium octoate | | | 0.7 (2.1) | 1 (3.1) | | | | | 2.2 (6.7) | |
| Potassium octoate | | | | | 0.3 (0.9) | 0.5 (1.5) | | | | 1 (3.1) |
| 60° reflectance (%) | | | | | | | | | | |
| Geled by heating for 40 s. | 62 | 58 | 15 | 57 | 25 | 48 | 44 | 43 | 55 | 51 |
| Geled by heating for 80 s. | 7 | 31 | 3 | 35 | 18 | 38 | 59 | 44 | 52 | 55 |
| Geled by heating for 120 s. | 3 | 10 | 3 | 4 | 5 | 24 | 57 | 47 | 50 | 59 |

Amount added is expressed in grams and $\times 10^{-3}$ mol (in parenthesis).

What is claimed is:

1. A method of making a matte-finished vinyl chloride resin article, which comprises providing a vinyl chloride resin composition containing 0.002–0.02 mol of a zinc carboxylate per 100 g of a vinyl chloride resin and 0.3–5 mol of a compound having two or more alcoholic hydroxyl groups in one molecule per mol of the zinc carboxylate, the content of an alkaline earth metal carboxylate in said composition being less than 0.7 mol, and the content of each of tin compound, lead compound and alkali metal carboxylate in said composition being less than 0.3 mol per mol of the zinc carboxylate; molding said composition into an article; heat-treating said article, after the molding, to produce said matte-finished vinyl chloride resin article; and stopping said heat-treating upon production of said matte-finished vinyl chloride resin article.

2. A method as defined in claim 1, wherein the zinc carboxylate is a zinc salt of a monocarboxylic acid having 3 to 18 carbon atoms.

3. A method as defined in claim 2, wherein the zinc carboxylate is a zinc salt of a monocarboxylic acid having 6–10 carbon atoms.

4. A method as defined in claim 3, wherein the zinc carboxylate is one which is selected from zinc hexanoate, zinc heptanoate, zinc octonoate, zinc nonanoate and zinc decanoate.

5. A method as defined in claim 1, wherein the amount of the zinc carboxylate is 0.0025 to 0.02 mol 100 g of vinyl chloride resin.

6. A method as defined in claim 1, wherein the compound having two or more alcoholic hydroxyl groups in one molecule is a polyhydric alcohol or a partial ester formed from said polyhydric alcohol and a fatty acid.

7. A method as defined in claim 6, wherein the polyhydric alcohol is one which is selected from sorbitols, pentaerythritols, and glycerin.

8. A method as defined in claim 6, wherein the partial ester formed from a polyhydric alcohol and a fatty acid is one which is selected from sorbitan partial esters, glycerin partial esters, condensed glycerin partial esters, pentaerythritol partial esters, condensed pentaerythritol partial esters, trimethylolpropane monoesters, and partial esters formed from glycerin and hydroxycarboxylic acid.

9. A method as defined in claim 6, wherein the partial ester formed from a polyhydric alcohol and a fatty acid is one which is selected from sorbitan monolaurate, sorbitan monopalmitate, sorbitan monostearate, sorbitan distearate, sorbitan monooleate, glycerin monolaurate, and diglycerin monolaurate.

10. A method as defined in claim 1, wherein the amount of the compound having two or more alcoholic hydroxyl groups in one molecule is 0.5 to 4.5 mol per mol of the zinc carboxylate.

11. A matte-finished article which is obtained by molding a vinyl chloride resin composition containing 0.002–0.02 mol of a zinc carboxylate per 100 g of a vinyl chloride resin and 0.3–5 mol of a compound having two or more alcoholic hydroxyl groups in one molecule per mol of the zinc carboxylate, the content of an alkaline earth metal carboxylate in said composition being less than 0.7 mol, and the content of each of tin compound, lead compound and alkali metal carboxylate in said composition being less than 0.3 mol per mol of the zinc carboxylate; and heat-treating the resulting molded product, after the molding, until said matte-finished article is produced.

* * * * *